United States Patent
Amdahl

(10) Patent No.: US 10,476,992 B1
(45) Date of Patent: Nov. 12, 2019

(54) METHODS FOR PROVIDING MPTCP PROXY OPTIONS AND DEVICES THEREOF

(71) Applicant: F5 Networks, Inc., Seattle, WA (US)

(72) Inventor: Saxon Amdahl, Mountain View, CA (US)

(73) Assignee: F5 NETWORKS, INC., Seattle, WA (US)

( * ) Notice: Subject to any disclaimer, the term of this patent is extended or adjusted under 35 U.S.C. 154(b) by 25 days.

(21) Appl. No.: 15/203,413

(22) Filed: Jul. 6, 2016

Related U.S. Application Data

(60) Provisional application No. 62/189,088, filed on Jul. 6, 2015.

(51) Int. Cl.
| | |
|---|---|
| *H04L 29/06* | (2006.01) |
| *H04L 29/08* | (2006.01) |
| *H04L 5/00* | (2006.01) |
| *H04L 7/00* | (2006.01) |
| *H04L 12/24* | (2006.01) |
| *H04L 12/707* | (2013.01) |

(52) U.S. Cl.
CPC ............ *H04L 69/16* (2013.01); *H04L 5/0055* (2013.01); *H04L 7/0008* (2013.01); *H04L 41/08* (2013.01); *H04L 45/24* (2013.01); *H04L 67/141* (2013.01); *H04L 67/28* (2013.01); *H04L 69/329* (2013.01)

(58) Field of Classification Search
CPC ..... H04L 69/16; H04L 69/329; H04L 67/141; H04L 67/28; H04L 45/24
See application file for complete search history.

(56) References Cited

U.S. PATENT DOCUMENTS

| | | |
|---|---|---|
| 6,311,278 B1 | 10/2001 | Raanan et al. |
| 6,330,574 B1 | 12/2001 | Murashita |
| 6,363,056 B1 | 3/2002 | Beigi et al. |
| 6,505,242 B2 | 6/2003 | Holland et al. |
| 6,883,137 B1 | 4/2005 | Girardot et al. |
| 6,886,132 B1 | 4/2005 | Hall et al. |
| 6,970,924 B1 | 11/2005 | Chu et al. |
| 6,973,490 B1 | 12/2005 | Robertson et al. |
| 6,990,074 B2 | 1/2006 | Wan et al. |
| 7,003,564 B2 | 2/2006 | Greuel et al. |
| 7,065,482 B2 | 6/2006 | Shorey et al. |

(Continued)

OTHER PUBLICATIONS

Box et al.; Simple Object Access Protocol (SOAP); 1.1; May 8, 2000; pp. 1-34.

(Continued)

*Primary Examiner* — Patrice L Winder
(74) *Attorney, Agent, or Firm* — Pepper Hamilton LLP

(57) ABSTRACT

A method, non-transitory computer readable medium, and device that provides multi-path TCP (MPTCP) proxy options includes receiving a SYN packet comprising one or more MPTCP options as a request for a new TCP connection. A new SYN packet including information from the received SYN packet is generated and the generated new SYN packet is forwarded to the server. A SYN acknowledgement including information associated with one or more supported MPTCP options is received from the server. A new SYN acknowledgement packet including the information from the received SYN acknowledgement is generated and forwarded to the requesting client computing device.

20 Claims, 5 Drawing Sheets

(56) References Cited

U.S. PATENT DOCUMENTS

| | | | |
|---|---|---|---|
| 7,080,314 B1 | 7/2006 | Garofalakis et al. | |
| 7,089,491 B2 | 8/2006 | Feinberg et al. | |
| 7,191,163 B2 | 3/2007 | Herrera et al. | |
| 7,197,639 B1 | 3/2007 | Juels et al. | |
| 7,292,541 B1 | 11/2007 | C S | |
| 7,296,061 B2 | 11/2007 | Martinez et al. | |
| 7,296,263 B1 | 11/2007 | Jacob | |
| 7,409,440 B1 | 8/2008 | Jacob | |
| 7,468,979 B2 | 12/2008 | Ricciulli | |
| 7,577,758 B2 | 8/2009 | Ricciulli | |
| 7,584,393 B2 | 9/2009 | Kamada et al. | |
| 7,710,867 B1 | 5/2010 | Masters | |
| 7,774,492 B2 | 8/2010 | Raphel et al. | |
| 7,860,815 B1 | 12/2010 | Tangirala | |
| 8,001,246 B2 | 8/2011 | Lu et al. | |
| 8,112,308 B1 | 2/2012 | Ho et al. | |
| 8,261,351 B1 | 9/2012 | Thornewell et al. | |
| 8,400,923 B2 * | 3/2013 | Kini | H04L 45/24 370/235 |
| 8,407,576 B1 | 3/2013 | Yin et al. | |
| 8,824,480 B2 * | 9/2014 | Hampel | H04L 45/24 370/230 |
| 9,294,548 B2 * | 3/2016 | Cui | H04L 69/14 |
| 9,456,464 B2 * | 9/2016 | Biswas | H04L 45/24 |
| 9,503,223 B2 * | 11/2016 | Wu | H04L 43/10 |
| 9,578,055 B1 | 2/2017 | Khanal | |
| 9,674,054 B2 * | 6/2017 | Scharf | H04L 69/16 |
| 9,843,646 B2 * | 12/2017 | Roeland | H04L 61/2007 |
| 9,930,013 B2 * | 3/2018 | Ossipov | H04L 63/029 |
| 2002/0087571 A1 | 7/2002 | Stapel et al. | |
| 2002/0087744 A1 | 7/2002 | Kitchin | |
| 2002/0099829 A1 | 7/2002 | Richards et al. | |
| 2002/0174216 A1 | 11/2002 | Shorey et al. | |
| 2003/0018450 A1 | 1/2003 | Carley | |
| 2003/0033369 A1 | 2/2003 | Bernhard | |
| 2003/0131052 A1 | 7/2003 | Allan | |
| 2003/0191803 A1 | 10/2003 | Chinnici et al. | |
| 2003/0200289 A1 | 10/2003 | Kemp et al. | |
| 2003/0212954 A1 | 11/2003 | Patrudu | |
| 2003/0236995 A1 | 12/2003 | Fretwell, Jr. | |
| 2004/0006741 A1 | 1/2004 | Radja et al. | |
| 2004/0015783 A1 | 1/2004 | Lennon et al. | |
| 2004/0123277 A1 | 6/2004 | Schrader et al. | |
| 2004/0133605 A1 | 7/2004 | Chang et al. | |
| 2004/0138858 A1 | 7/2004 | Carley | |
| 2004/0143670 A1 | 7/2004 | Roychowdhury et al. | |
| 2004/0215665 A1 | 10/2004 | Edgar et al. | |
| 2004/0225656 A1 | 11/2004 | Sarkar | |
| 2005/0028080 A1 | 2/2005 | Challenger et al. | |
| 2005/0160153 A1 | 7/2005 | Knutson et al. | |
| 2005/0246717 A1 | 11/2005 | Poole et al. | |
| 2006/0015846 A1 | 1/2006 | Fraleigh et al. | |
| 2006/0235976 A1 | 10/2006 | Chen et al. | |
| 2006/0277606 A1 | 12/2006 | Yunus et al. | |
| 2006/0282442 A1 | 12/2006 | Lennon et al. | |
| 2006/0291388 A1 | 12/2006 | Amdahl | |
| 2007/0011605 A1 | 1/2007 | Dumitru et al. | |
| 2007/0064610 A1 | 3/2007 | Khandani et al. | |
| 2007/0067839 A1 | 3/2007 | Hamada et al. | |
| 2007/0067841 A1 | 3/2007 | Yegneswaran et al. | |
| 2007/0150574 A1 | 6/2007 | Mallal et al. | |
| 2008/0065653 A1 | 3/2008 | Shneur et al. | |
| 2008/0168150 A1 | 7/2008 | Chen et al. | |
| 2008/0212499 A1 | 9/2008 | Maes | |
| 2008/0228911 A1 | 9/2008 | Mackey | |
| 2008/0271046 A1 | 10/2008 | Lipton et al. | |
| 2009/0037998 A1 | 2/2009 | Adhya et al. | |
| 2009/0217386 A1 | 8/2009 | Schneider | |
| 2010/0031315 A1 | 5/2010 | Feng et al. | |
| 2010/0138809 A1 | 6/2010 | Shenfield et al. | |
| 2010/0242092 A1 | 9/2010 | Harris et al. | |
| 2010/0306827 A1 | 12/2010 | Balducci et al. | |
| 2012/0226802 A1 * | 9/2012 | Wu | H04L 69/14 709/224 |
| 2012/0331160 A1 * | 12/2012 | Tremblay | H04L 69/14 709/228 |
| 2014/0321462 A1 | 10/2014 | Kancherla | |
| 2014/0365680 A1 | 12/2014 | Van Bemmel | |
| 2015/0095502 A1 * | 4/2015 | Le Bolzer | H04L 45/24 709/227 |
| 2015/0263959 A1 * | 9/2015 | Patwardhan | H04L 47/193 370/235 |
| 2015/0319270 A1 * | 11/2015 | Roeland | H04L 61/2007 370/254 |
| 2016/0142373 A1 * | 5/2016 | Ossipov | H04L 63/0236 713/171 |

OTHER PUBLICATIONS

Levy, Ken; New XML Tools in Visual Studio 2005; Jul. 21, 2004; MSDN Blogs; p. 1.

Robot Wars—How Botnets Work, http://www.windowsecurity.com/articles/Robot-Wars-How-Botnets-Work.html, launched Oct. 20, 2005 (accessed Dec. 15, 2006) 10 pgs.

F5 Networks, Inc., "Application Firewalls", White Paper, Copyrighted Oct. 2007, 7 pgs.

"Ethereal—Interactively browse network traffic," www.ethereal.com/docs/man-pages/ethereal.1.html, (accessed Apr. 15, 2004).

"Tetheral—Dump and analyze network traffic," www.ethereal.com/docs/man-pages/tethereal.1.html, (accessed Apr. 15, 2004).

"Editcap—Edit and/or translate the format of capture files," www.ethereal.com/docs/man-pages/editcap.1.html, (accessed Apr. 15, 2004).

"Network Sniffer," www.linuxmigration.com/quickref/admin/ethereal.html, (accessed Apr. 15, 2004).

"FAQ: Network INtrusion Detection Systems," Version 0.8.3, Mar. 21, 2000, www.robertgraham.com/pubs/network-intrusion-detection.html.

Secure64 Software Corporation, "Surviving DNS DDoS Attacks: Introducing self-protecting servers," White Paper, Mar. 19, 2007 (18 pages).

"The-binary Advisory," The Honeynet Project, 4 pages, http://www.honeynet.org/reverse/results/sol/sol-17/advisory.html (accessed Feb. 20, 2008).

"Denial-of-service attack," Wikipedia, the free encyclopedia, 10 pages, http://en.wikipedia.org/w/index.php?title=Denial-of-service_attack&printables=yes (accessed Nov. 5, 2007).

"Canonical Name Record (CNAME)," CNAME Record: Chapter 8, ZyTrax, Inc., 3 page, http://www.zytrax.com/books/dns/ch8/cname.html (accessed Feb. 20, 2008).

F5 Networks Inc., "Optimize WAN and LAN Application Performance with TCP Express", F5 Networks Inc., White Paper, Aug. 2007, pp. 1-7, <www.f5.com>.

F5 Networks Inc., "Take Control of Multiple ISP Connections", F5 Networks Inc., BIG-IP Link Controller, Datasheet, Nov. 26, 2013, pp. 1-4, <www.f5.com>.

F5 Networks Inc., "Application Delivery with Programmable Infrastructure", F5 Networks Inc., BIG-IP Local Traffic Manager, Datasheet, Jul. 29, 2014, pp. 1-8, <www.f5.com>.

F5 Networks, Inc., "BIG-IP® Local Traffic Manager™: Implementations", Manual, May 24, 2016, pp. 1-232, 12.1, F5 Networks, Inc.

* cited by examiner

METHODS FOR PROVIDING MPTCP PROXY OPTIONS AND DEVICES THEREOF

This application claims the benefit of U.S. Provisional Patent Application Ser. No. 62/189,088, filed Jul. 6, 2015, which is hereby incorporated by reference in its entirety.

FIELD

This technology generally relates to methods and devices for network traffic management and, more particularly, to methods for providing MPTCP proxy options and devices thereof.

BACKGROUND

Similar to transmission control protocol (TCP) options, a multipath transmission control protocol (MPTCP) is negotiated between a client and a server and the first negotiation involves generating a secret which is reused in subsequent negotiations.

However, one of the existing challenges with MPTCP is the proliferation of TCP proxies between clients and servers in service provider networks. These TCP proxies are configured to negotiate options with the client rather than with the server. With MPTCP, this has the effect of establishing the shared secret between the TCP proxy and the client, but not with the corresponding server. As a result and unfortunately, if the client attempts to negotiate the MPTCP across another network path to that server which does not include the proxy, the MPTCP option negotiation will fail because the shared secret is not known. This failure then has the consequence of breaking a critical feature of MPTCP which is providing mobility of connections for the client.

SUMMARY

A method for providing MPTCP proxy options includes receiving by a network traffic manager apparatus, a SYN packet comprising one or more MPTCP options as a request for a new TCP connection. A new SYN packet including the information from the received SYN packet is generated by the network traffic manager apparatus and the generated new SYN packet is forwarded to a server. Next, a SYN acknowledgement packet is received by the network traffic manager apparatus from the server where the received SYN acknowledgement packet includes information associated with one or more supported MPTCP options. A new SYN acknowledgement packet including the information from the received SYN acknowledgement packet including the one or more supported MPTCP options is generated by the network traffic manager apparatus and the generated new SYN acknowledgement forwarded to the requesting client computing device.

A non-transitory computer readable medium having stored thereon instructions for providing MPTCP proxy options comprising machine executable code which when executed by at least one processor, causes the processor to perform steps includes receiving a SYN packet comprising one or more MPTCP options as a request for a new TCP connection. A new SYN packet including the information from the received SYN packet is generated and the generated new SYN packet is forwarded to a server. Next, a SYN acknowledgement packet is received from the server where the received SYN acknowledgement packet includes information associated with one or more supported MPTCP options. A new SYN acknowledgement packet including the information from the received SYN acknowledgement packet including the one or more supported MPTCP options is generated and the generated new SYN acknowledgement forwarded to the requesting client computing device.

A network traffic manager apparatus including one or more processors coupled to a memory and configured to be capable of executing programmed instructions comprising and stored in the memory to receive a SYN packet comprising one or more MPTCP options as a request for a new TCP connection. A new SYN packet including the information from the received SYN packet is generated and the generated new SYN packet is forwarded to a server. Next, a SYN acknowledgement packet is received from the server where the received SYN acknowledgement packet includes information associated with one or more supported MPTCP options. A new SYN acknowledgement packet including the information from the received SYN acknowledgement packet including the one or more supported MPTCP options is generated and the generated new SYN acknowledgement forwarded to the requesting client computing device.

This technology provides a number of advantages including providing a method, non-transitory computer readable medium and apparatus that effectively assists with extending the ability to provide MPTCP proxy options. With the claimed technology the client device is now able to seamlessly negotiate MPTCP options with the server that will result in better user experience to the client device.

DETAILED DESCRIPTION

Figure 1:
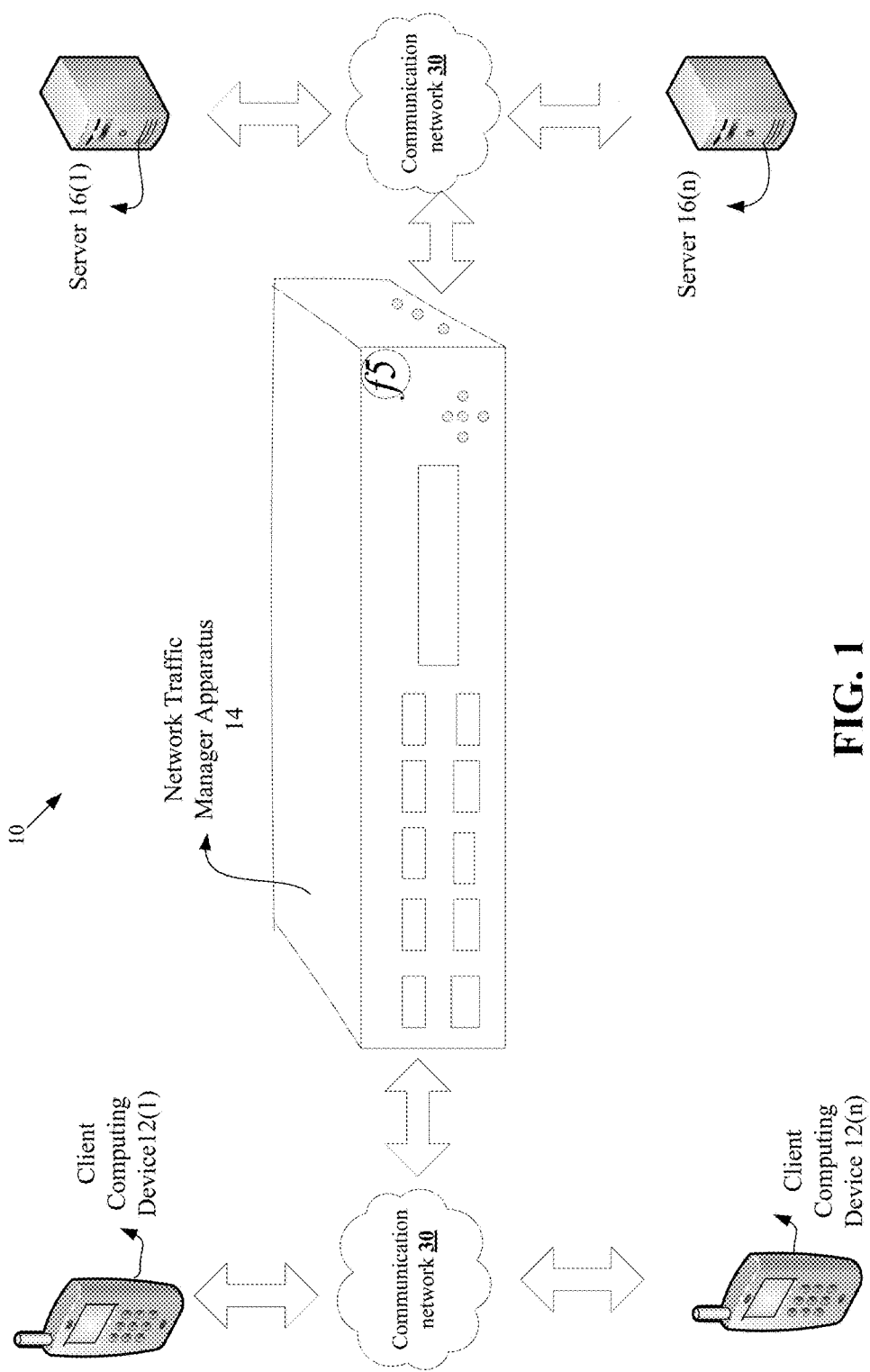
FIG. 1 is an example of a block diagram of an environment including an network traffic manager apparatus for providing MPTCP proxy options.
Figure 2:
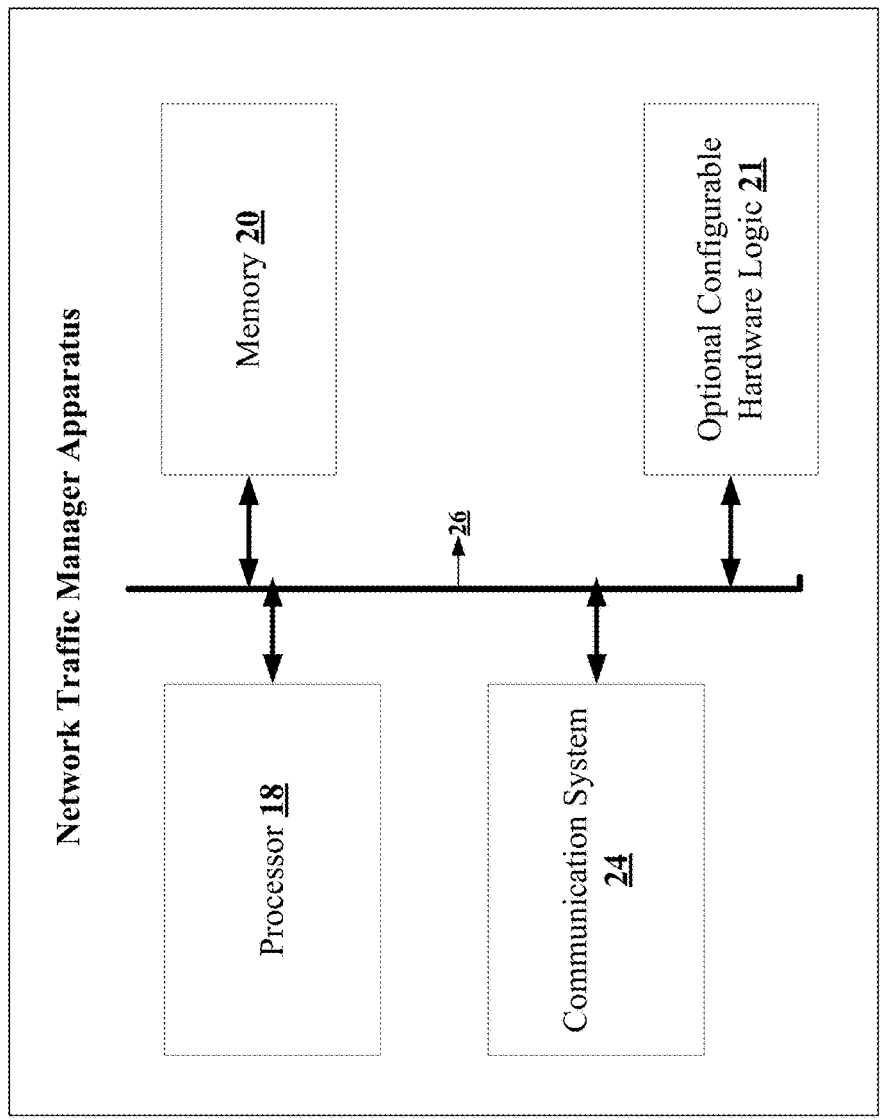
FIG. 2 is an example of a block diagram of the network traffic manager apparatus.

An example of a network environment 10 for providing multipath transmission control protocol (MPTCP) with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing MPTCP proxy options.

Referring more specifically to FIGS. 1 and 2, network traffic manager apparatus 14 is coupled to the plurality of client computing devices 12(1)-12(n) through the communication network 30, although the plurality of client computing devices 12(1)-12(n), and network traffic manager apparatus 14 may be coupled together via other topologies.

Additionally, network traffic manager apparatus 14 is coupled to the plurality of servers 16(1)-16(n) through the communication network 30, although the plurality of servers 16(1)-16(n) and network traffic manager apparatus 14 may be coupled together via other topologies.

The network traffic manager apparatus 14 assists with providing MPTCP proxy options as illustrated and described by way of the examples herein, although network traffic manager apparatus 14 may perform other types and/or numbers of functions. As illustrated in FIG. 2, the network traffic manager apparatus 14 may include a processor or central processing unit (CPU) 18, a memory 20, optional configurable hardware logic 21, and a communication system 24 which are coupled together by a bus 26, although the network traffic manager apparatus 14 may comprise other types and numbers of elements in other configurations. In this example, the bus 26 is a PCI Express bus in this example, although other bus types and links may be used.

The processor 18 within the network traffic manager apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
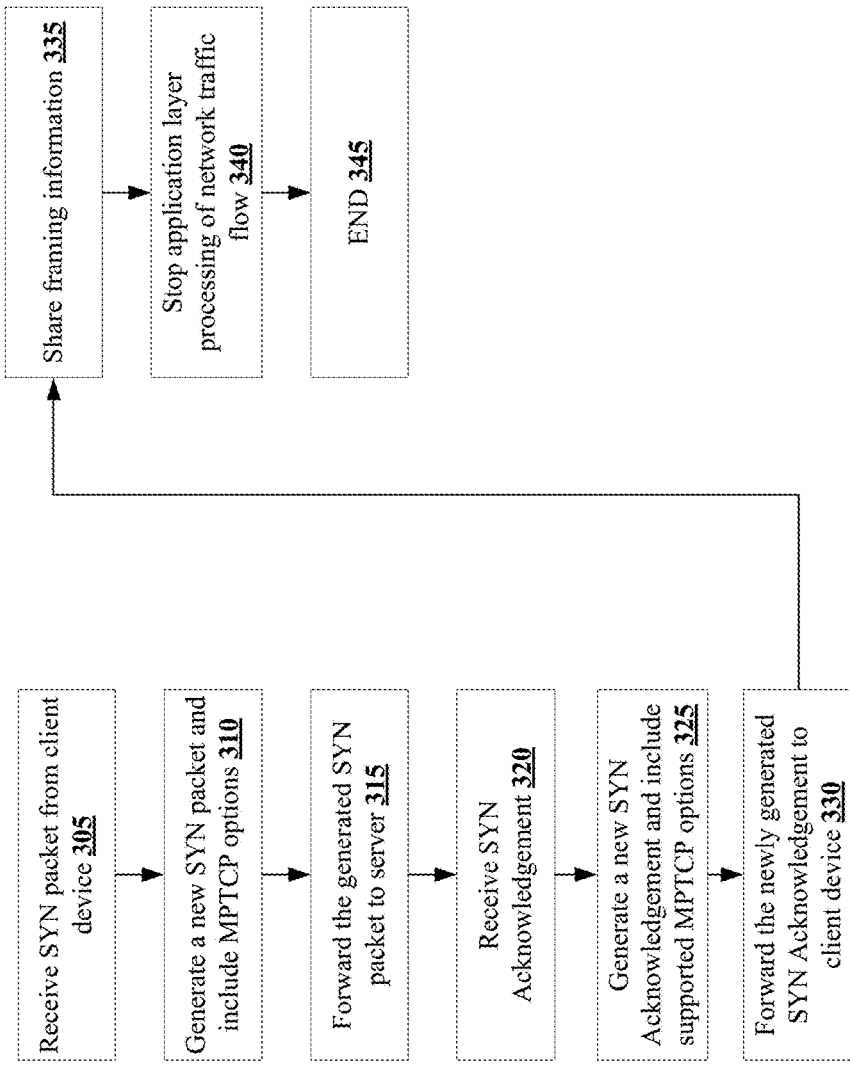
FIG. 3 is an exemplary flowchart of a method for a client device to establish a MPTCP connection with a server.
Figure 4:
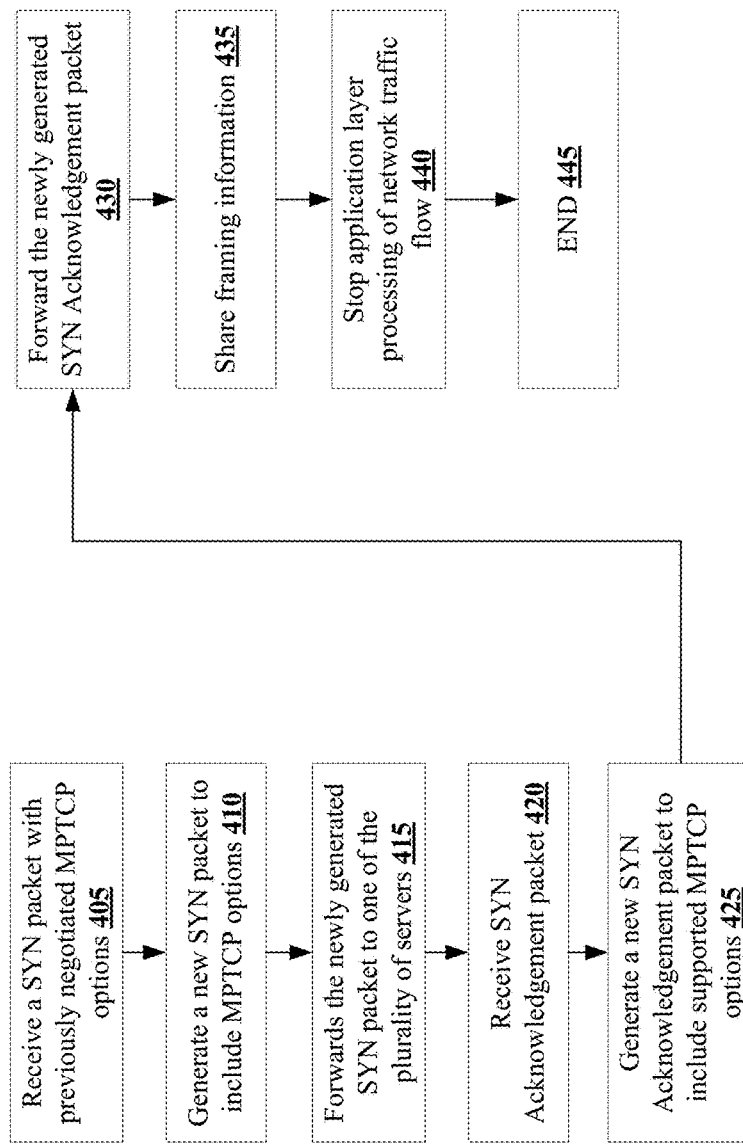
FIG. 4 is an exemplary flowchart of a method for using information from an existing TCP connection and providing proxy MPTCP options.

Memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-4 are representative of example steps or actions of this technology that may be embodied or expressed as one or more non-transitory computer or machine readable instructions stored in memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the mobile network traffic manager apparatus may be managed or supervised by a hypervisor.

The optional configurable hardware logic 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the network traffic manager apparatus 14 to conduct one or more operations with the plurality of servers 16(1)-16(n), such as to obtain data from one of the plurality of servers 16(1)-16(n), by way of example only, although other numbers and/or types of systems could be utilizing these resources and other types and numbers of functions utilizing other types of protocols could be performed.

Each of the plurality of servers 16(1)-16(n) include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the servers 16(1)-16(n) operate within the memory 20 of the network traffic manager apparatus 14.

While network traffic manager apparatus 14 is illustrated in this example as including a single device, network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of network traffic manager apparatus 14 in these examples can be in a same or a different communication network 30 including one or more public, private, or cloud networks, for example.

Although an exemplary environment 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as network traffic manager apparatus 14, plurality of client computing devices 12(1)-12(n), or plurality of servers 16(1)-16(n), for example, may be configured to operate as virtual instances on the same physical machine. In other words, one or more of network traffic manager apparatus 14, plurality of client computing devices 12(1)-12(n), or plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or plurality of servers 16(1)-16(n) than depicted in FIG. 1. The plurality of client computing devices 12(1)-12(n) or the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for providing MPTCP proxy options will now be described with reference to FIGS. 1-5. In particular, an example of a method for one of the plurality of client computing devices 12(1)-12(n) establishing an MPTCP connection with the one of the plurality of servers 16(1)-16(n) will now be illustrated and described with reference to FIGS. 3 and 5.

More specfically, in step 305 the network traffic manager apparatus 14 receives an initial SYN packet from one of the plurality of client computing devices 12(1)-12(n) requesting for a TCP connection via a first communication network in the communication network 30, although the network traffic manager apparatus 14 can receive other types or amounts of requests from the plurality of client computing devices 12(1)-12(n). In this example, one of the first communication networks in the communication network 30 can be a Wi-Fi network, although the other types of communication network can be used by the requesting one of the plurality of client computing devices 12(1)-12(n). In this example, the received initial SYN packet includes MPTCP options in the MP_CAPABLE information of the SYN packet, although other types or amounts of information can be included in the SYN packet received by the network traffic manager apparatus 14.

Next in step 310, the network traffic manager apparatus 14 generates a new initial SYN packet and copies the information present in the received SYN packet (MPTCP options) that was received from the requesting one of the plurality of client computing devices 12(1)-12(n). In this example while generating the new initial SYN packet, the network traffic manager apparatus 14 first copies the information from the SYN packet received from the requesting one of the plurality of client computing devices 12(1)-12(n) and then can optionally include additional MPTCP options that it would like to negotiate with one of the plurality of servers 16(1)-16(n), although the network traffic manager apparatus 14 can include other types or amounts information in the generated new SYN packet. Further in this example, the network traffic manager apparatus 14 only copies the MPTCP options from the received initial SYN packet and the non-MPTCP options are determined and included in the new generated initial SYN packet based on the configuration of the network traffic manager apparatus 14.

Next in step 315, the network traffic manager apparatus 14 forwards the generated new initial SYN packet to one of the plurality of servers 16(1)-16(n).

Responsive to sending the newly generated SYN packet, in step 320 the network traffic manager apparatus 14 receives an initial SYN Acknowledgement packet back from one of the plurality of servers 16(1)-16(n) to which the newly generated initial SYN packet was sent, although the network traffic manager apparatus 14 can receive other types or amounts of information from the plurality of servers 16(1)-16(n). In this example, the initial SYN Acknowledgement packet received by the network traffic manager apparatus 14 includes information associated with the MPTCP options supported by one of the plurality of servers 16(1)-16(n) to which the newly generated SYN packet was sent, although the initial SYN Acknowledgement packet can include other types or amounts of information.

Next in step 325, the network traffic manager apparatus 14 generates a new initial SYN Acknowledgement packet and includes information from the received initial SYN Acknowledgement that is associated with the MPTCP options which is supported by one of the plurality of servers 16(1)-16(n) for which the requesting one of the plurality of client computing devices 12(1)-12(n) was trying to negotiate, although the newly generated initial SYN Acknowledgement packet can include other types or amounts of information. Further in this example, the network traffic manager apparatus 14 only copies the MPTCP options from the received initial SYN Acknowledgement packet and the non-MPTCP options is determined and including the new generated initial SYN Acknowledgment packet based on the configuration of the network traffic manager apparatus 14.

Next in step 330, the network traffic manager apparatus 14 forwards the generated new initial SYN Acknowledgement packet to the requesting one of the plurality of client computing devices 12(1)-12(n). By forwarding the generated new initial SYN Acknowledgement packet to the requesting one of the plurality of client computing devices 12(1)-12(n), the requesting one of the plurality of client computing devices 12(1)-12(n) begins to communicate with one of the plurality of servers 16(1)-16(n) using the MPTCP options that were negotiated and network packets are transmitted between the requesting one of the plurality of client computing devices 12(1)-12(n) and the one of the plurality of servers 16(1)-16(n) with which the TCP connection is established.

Once the TCP connection is established in step 335, MPTCP framing information between the client side connection (requesting one of the plurality of client computing devices 12(1)-12(n) and the network traffic manager apparatus 14) and the server side connection (one of the plurality of servers 16(1)-16(n) and the network traffic manager apparatus 14) is shared so that the framing on both sides can be preserved.

Next in step 340, the network traffic manager apparatus 14 stops the application layer level processing of the network traffic flow upon the TCP connection between the requesting one of the plurality of client computing devices 12(1)-12(n) and one of the plurality of servers 16(1)-16(n) being established.

Figure 5:
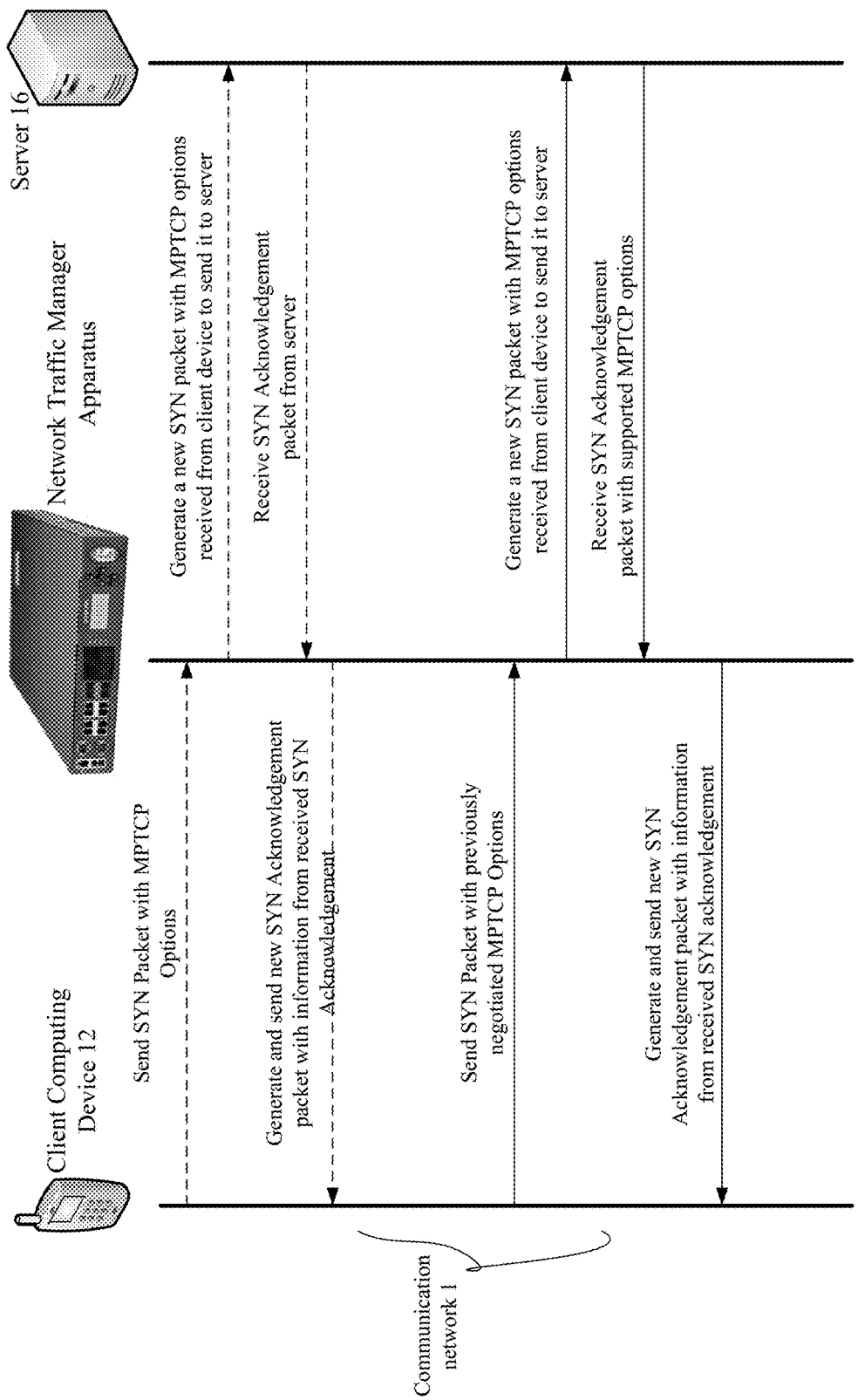
FIG. 5 is an exemplary sequence diagram illustrating a method for providing MPTCP proxy options.

Next, an example of a method for using information from an existing TCP connection and providing proxy MPTCP options will now be illustrated with reference to FIGS. 4 and 5. In this example illustrated with reference to FIGS. 4 and 5, in step 405 the network traffic manager apparatus 14 receives a subsequent SYN packet with previously negotiated MPTCP options from one of the plurality of client computing devices 12(1)-12(n) and uses these negotiated MPTCP options to establish a new TCP connection via the communication network 30. In this example, the subsequent SYN packet received by the network traffic manager apparatus 14 is the first SYN packet that the requesting one of the plurality of client computing devices 12(1)-12(n) is sending to the network traffic manager apparatus 14 to establish a new TCP connection and join the previous MPTCP connection.

In this example, the subsequent SYN packet received by the network traffic manager apparatus 14 includes: information associated with a TCP connection that was previously established between the requesting one of the plurality of client computing devices 12(1)-12(n) and the one of the plurality of servers 16(1)-16(n); and the MPTCP options that was previously negotiated between the requesting one of the plurality of client computing devices 12(1)-12(n) and the one of the plurality of servers 16(1)-16(n). In addition to the information and options noted above, the received subsequent SYN packet also includes a request for a join operation with a previously established TCP connection with one of the plurality of servers 16(1)-16(n), although the SYN packet could include other types and/or amounts of other information.

Next in step 410, the network traffic manager apparatus 14 generates a new subsequent SYN packet similar to the one that was received from the requesting one of the plurality of client computing devices 12(1)-12(n). In this example while generating the new subsequent SYN packet, the network traffic manager apparatus 14 first copies the information from the subsequent SYN packet received from the requesting one of the plurality of client computing devices 12(1)-12(n) and can optionally include additional MPTCP options that it would like to negotiate with one of the plurality of servers 16(1)-16(n), although the network traffic manager apparatus 14 can include other types or amounts information in the generated new subsequent SYN packet. Further in this example, the network traffic manager apparatus 14 only copies the MPTCP options from the received subsequent SYN packet and the non-MPTCP options are determined and included in the new generated subsequent SYN packet based on the configuration of the network traffic manager apparatus 14.

Next in step 415, the network traffic manager apparatus 14 forwards to one of the plurality of servers 16(1)-16(n) the generated new subsequent SYN packet that now includes: the MPTCP options previously negotiated between the requesting one of the plurality of client computing devices 12(1)-12(n) and one of the plurality of servers 16(1)-16(n); and can optionally include the additional MPTCP options that the network traffic manager apparatus 14 is looking to negotiate with one of the plurality of servers 16(1)-16(n), although the newly generated subsequent SYN packet can include other types or amounts of information.

In response to forwarding the generated new subsequent SYN packet, in step 420 the network traffic manager apparatus 14 receives a subsequent SYN Acknowledgement back from one of the plurality of servers 16(1)-16(n) to which the newly generated subsequent SYN packet was sent. In this example, the subsequent SYN Acknowledgement packet received by the network traffic manager apparatus 14 includes the MPTCP options of the previously negotiated MPTCP options and optionally the additional MPTCP options that can be supported by the one of the plurality of servers 16(1)-16(n) that received the newly generated SYN packet. Additionally in this example, the subsequent SYN Acknowledgement packet may include the approval for the join operation that was initially requested by the requesting one of the plurality of client computing devices 12(1)-12(n) to join an existing MPTCP connection between the requesting one of the plurality of client computing devices 12(1)-12(n) and one of the plurality of servers 16(1)-16(n).

Next in step 425, the network traffic manager apparatus 14 generates a new subsequent SYN Acknowledgement packet and includes: information associated with the MPTCP options that is supported by one of the plurality of servers 16(1)-16(n) for which the MPTCP options was previously negotiated with the requesting one of the plurality of client computing devices 12(1)-12(n); and information associated with approval for the join operation to join an existing TCP connection between the requesting one of the plurality of client computing devices 12(1)-12(n) and one of the plurality of servers 16(1)-16(n), although the newly generated subsequent SYN Acknowledgement packet can include other types or amounts of information. Further in this example, the network traffic manager apparatus 14 only copies the MPTCP options from the received subsequent SYN Acknowledgement packet and the non-MPTCP options are determined and included in the new generated subsequent SYN Acknowledgement packet based on the configuration of the network traffic manager apparatus 14.

Next in step 430, the network traffic manager apparatus 14 forwards the newly generated subsequent SYN Acknowledgement packet back to the requesting one of the plurality of client computing devices 12(1)-12(n). As illustrated above, the newly generated subsequent SYN Acknowledgement packet includes the approval to the join operation that was previously requested and information associated with the MPTCP options that are supported by one of the plurality of servers 16(1)-16(n) in response to the MPTCP options requested by the requesting one of the plurality of client computing devices 12(1)-12(n). Upon forwarding the generated new subsequent SYN Acknowledgement packet to the requesting one of the plurality of client computing devices 12(1)-12(n), an existing TCP connection between the requesting one of the plurality of client computing devices 12(1)-12(n) and one of the plurality of servers 16(1)-16(n) is joined with the new TCP connection.

Once the join operation has been completed, in step 435 the MPTCP framing information between the client side connection (requesting one of the plurality of client computing devices 12(1)-12(n) and the network traffic manager apparatus 14) and the server side connection (one of the plurality of servers 16(1)-16(n) and the network traffic manager apparatus 14) is shared so that the framing on both sides can be preserved.

Next in step 440, the network traffic manager apparatus 14 stops the application layer level processing of the network traffic flow upon joining the existing TCP connection with and the new TCP connection and then this particular example of the method described and illustrated with reference to FIGS. 4 and 5 ends in step 445.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for providing proxy multipath transmission control protocol (MPTCP) options, the method implemented by a network traffic management system comprising one or more network traffic apparatuses, client devices, or server devices, the method comprising:

receiving a first request from a client to establish a transmission control protocol (TCP) connection, the first request comprising a first set of one or more MPTCP options supported by the client;

generating a second request comprising the first set of MPTCP options and a second set of one or more MPTCP options, to be negotiated with a server and different than the first set of MPTCP options, and sending the second request to the server;

receiving a first acknowledgement from the server, the first acknowledgement comprising a third set of one or more MPTCP options supported by the server; and generating a second acknowledgement comprising at least the third set of MPTCP options and sending the second acknowledgement to the client to establish the TCP connection.

2. The method as set forth in claim 1, further comprising sharing framing information with a client side connection and a server side connection.

3. The method as set forth in claim 1, further comprising halting application layer processing of communications between the client and the server once the TCP connection is established.

4. The method as set forth in claim 1, further comprising halting application layer processing of communications between the client and the server once the TCP connection is joined with an MPTCP connection between the client and the server.

5. The method as set forth in claim 1, wherein one or more of the second request or the second acknowledgement comprises one or more non-MPTCP options that are determined based on a stored configuration.

6. A non-transitory computer readable medium having stored thereon instructions for providing proxy multipath transmission control protocol (MPTCP) options comprising machine executable code which when executed by at least one processor, causes the processor to:
receive a first request from a client to establish a transmission control protocol (TCP) connection, the first request comprising a first set of one or more MPTCP options supported by the client;
generate a second request comprising the first set of MPTCP options and a second set of one or more MPTCP options, to be negotiated with a server and different than the first set of MPTCP options, and send the second request to the server;
receive a first acknowledgement from the server, the first acknowledgement comprising a third set of one or more MPTCP options supported by the server; and
generate a second acknowledgement comprising at least the third set of MPTCP options and send the second acknowledgement to the client to establish the TCP connection.

7. The medium as set forth in claim 6, wherein the machine executable code, when executed by the processor, further causes the processor to share framing information with a client side connection and a server side connection.

8. The medium as set forth in claim 6, wherein the machine executable code, when executed by the processor, further causes the processor to halt application layer processing of communications between the client and the server once the TCP connection is established.

9. The medium as set forth in claim 6, wherein the machine executable code, when executed by the processor, further causes the processor to halt application layer processing of communications between the client and the server once the TCP connection is joined with an MPTCP connection between the client and the server.

10. The medium as set forth in claim 6, wherein one or more of the second request or the second acknowledgement comprises one or more non-MPTCP options that are determined based on a stored configuration.

11. A network traffic manager apparatus, comprising memory comprising programmed instructions stored thereon and one or more processors configured to be capable of executing the stored programmed instructions to:
receive a first request from a client to establish a transmission control protocol (TCP) connection, the first request comprising a first set of one or more MPTCP options supported by the client;
generate a second request comprising the first set of MPTCP options and a second set of one or more MPTCP options, to be negotiated with a server and different than the first set of MPTCP options, and send the second request to the server;
receive a first acknowledgement from the server, the first acknowledgement comprising a third set of one or more MPTCP options supported by the server; and
generate a second acknowledgement comprising at least the third set of MPTCP options and send the second acknowledgement to the client to establish the TCP connection.

12. The apparatus as set forth in claim 11, wherein the processors are further configured to be capable of executing the stored programmed instructions to share framing information with a client side connection and a server side connection.

13. The apparatus as set forth in claim 11, wherein the processors are further configured to be capable of executing the stored programmed instructions to halt application layer processing of communications between the client and the server once the TCP connection is established.

14. The apparatus as set forth in claim 11, wherein the processors are further configured to be capable of executing the stored programmed instructions to halt application layer processing of communications between the client and the server once the TCP connection is joined with an MPTCP connection between the client and the server.

15. The apparatus as set forth in claim 11, wherein one or more of the second request or the second acknowledgement comprises one or more non-MPTCP options that are determined based on a stored configuration.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
receive a first request from a client to establish a transmission control protocol (TCP) connection, the first request comprising a first set of one or more MPTCP options supported by the client;
generate a second request comprising the first set of MPTCP options and a second set of one or more MPTCP options, to be negotiated with a server and different than the first set of MPTCP options, and send the second request to the server;
receive a first acknowledgement from the server, the first acknowledgement comprising a third set of one or more MPTCP options supported by the server; and
generate a second acknowledgement comprising at least the third set of MPTCP options and send the second acknowledgement to the client to establish the TCP connection.

17. The system as set forth in claim 16, wherein the processors are further configured to be capable of executing the stored programmed instructions to share framing information with a client side connection and a server side connection.

18. The system as set forth in claim 16, wherein the processors are further configured to be capable of executing the stored programmed instructions to halt application layer processing of communications between the client and the server once the TCP connection is established.

19. The system as set forth in claim 16, wherein the processors are further configured to be capable of executing the stored programmed instructions to halt application layer processing of communications between the client and the server once the TCP connection is joined with an MPTCP connection between the client and the server.

20. The system as set forth in claim 16, wherein one or more of the second request or the second acknowledgement comprises one or more non-MPTCP options that are determined based on a stored configuration.

* * * * *